(12) United States Patent
Rubin

(10) Patent No.: US 7,542,439 B2
(45) Date of Patent: Jun. 2, 2009

(54) METHODS AND APPARATUS FOR PROVIDING A COOPERATIVE RELAY SYSTEM ASSOCIATED WITH A BROADBAND WIRELESS ACCESS NETWORK

(75) Inventor: Amir Rubin, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 11/223,535

(22) Filed: Sep. 9, 2005

(65) Prior Publication Data

US 2007/0058577 A1 Mar. 15, 2007

(51) Int. Cl.
*H04B 7/14* (2006.01)

(52) U.S. Cl. .................. 370/315; 370/272; 370/342; 370/335; 370/252; 370/328; 455/9; 455/517

(58) Field of Classification Search ......... 370/328–335, 370/338–342, 465, 272, 315, 492; 455/422.1, 455/7, 9, 11.1, 500, 517
See application file for complete search history.

(56) References Cited

U.S. PATENT DOCUMENTS

| | | | |
|---|---|---|---|
| 7,203,508 B2 * | 4/2007 | Ohkubo et al. | 455/510 |
| 2004/0005882 A1 * | 1/2004 | Yoshii | 455/422.1 |
| 2005/0048914 A1 | 3/2005 | Sartori et al. | |
| 2005/0058104 A1 * | 3/2005 | Yomo et al. | 370/335 |
| 2005/0101330 A1 * | 5/2005 | Chang et al. | 455/446 |
| 2005/0286458 A1 * | 12/2005 | Furukawa et al. | 370/315 |
| 2006/0046643 A1 * | 3/2006 | Izumikawa et al. | 455/7 |
| 2006/0120392 A1 * | 6/2006 | Ye et al. | 370/338 |
| 2006/0153227 A1 * | 7/2006 | Hwang et al. | 370/465 |
| 2007/0072604 A1 * | 3/2007 | Wang | 455/428 |
| 2007/0116092 A1 * | 5/2007 | Nystrom et al. | 375/130 |

FOREIGN PATENT DOCUMENTS

| EP | 0 212 667 A2 | 3/1987 |
|---|---|---|
| WO | WO 2005/008947 A1 | 1/2005 |

OTHER PUBLICATIONS

Pabst R et al., "Relay-Based Deployment Concepts for Wireless and Mobile Broadband Radio", IEEE Communications Magazine, IEEE Service Center, New York, NY, US, vol. 42, No. 9, Sep. 2004, pp. 80-89.

* cited by examiner

*Primary Examiner*—Kamran Afshar
(74) *Attorney, Agent, or Firm*—Schwabe, Williamson & Wyatt, P.C.

(57) ABSTRACT

Embodiments of methods and apparatus for providing a cooperative relay system associated with a broadband wireless access network are generally described herein. Other embodiments may be described and claimed.

22 Claims, 7 Drawing Sheets ations and evolutions of these standards (e.g., 802.11x,
METHODS AND APPARATUS FOR PROVIDING A COOPERATIVE RELAY SYSTEM ASSOCIATED WITH A BROADBAND WIRELESS ACCESS NETWORK

TECHNICAL FIELD

The present disclosure relates generally to wireless communication systems, and more particularly, to methods and apparatus for providing a cooperative relay system associated with a broadband wireless access network.

BACKGROUND

The 802.16 family of standards were developed by the Institute of Electrical and Electronic Engineers (IEEE) to provide for fixed, portable, and/or mobile broadband wireless access networks (e.g., the IEEE std. 802.16, published 2004). The WiMAX Forum facilitates the deployment of broadband wireless networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

WiMAX is a wireless technology to deliver last-mile broadband connectivity in a larger geographical area than other wireless technology such as Wireless Fidelity (Wi-Fi). In particular, WiMAX technology may provide broadband or high-speed data connection to various geographical locations where wired transmission may be too costly, inconvenient, and/or unavailable. In one example, WiMAX technology may offer greater range and bandwidth to enable Ti-type service to businesses and/or cable/digital subscriber line (DSL)-equivalent access to homes.

DETAILED DESCRIPTION

In general, methods and apparatus for providing a cooperative relay system associated with a broadband wireless access (BWA) network are described herein. The methods and apparatus described herein are not limited in this regard.

Figure 1:
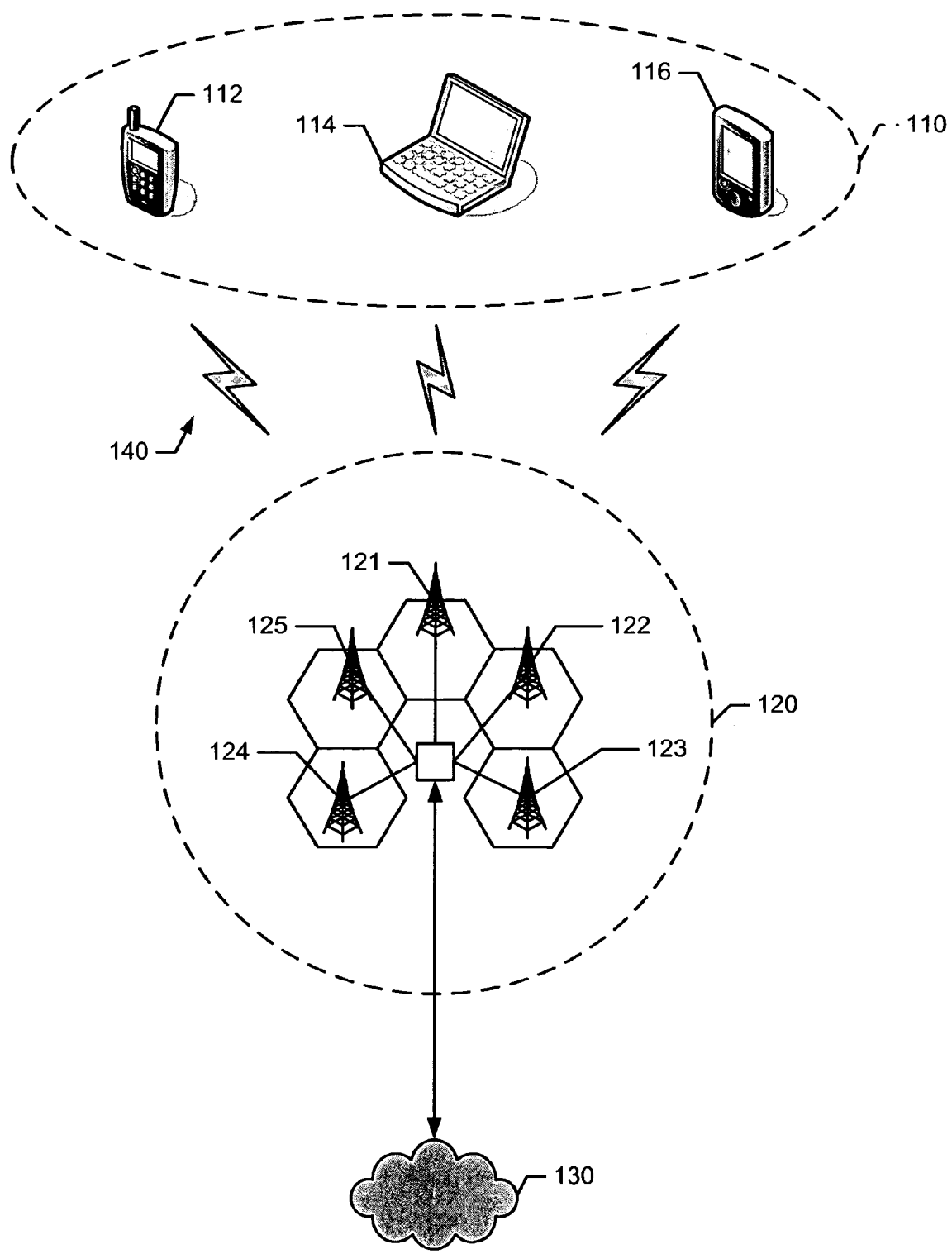
FIG. 1 is a schematic diagram representation of an example wireless communication system according to an embodiment of the methods and apparatus disclosed herein.

Referring to FIG. 1, an example wireless communication system 100 may include one or more subscriber stations 110, generally shown as 112, 114, and 116. For example, the subscriber stations 110 may include wireless electronic devices such as a desktop computer, a laptop computer, a handheld computer, a tablet computer, a cellular telephone, a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

The subscriber stations 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless communication links, generally shown as 140.

In one example, one or more of the subscriber stations 110 may implement OFDM modulation to transmit large amounts of digital data by splitting a radio frequency signal into multiple small sub-signals, which in turn, are transmitted simultaneously at different frequencies. In particular, the subscriber stations 110 may use OFDM modulation as described in the 802.xx family of standards developed by IEEE and/or variations and evolutions of these standards (e.g., 802.11x, 802.15, 802.16x, etc.) to communicate via wireless communication links. For example, the subscriber stations 110 may operate in accordance with the 802.16 family of standards developed by IEEE to provide for fixed, portable, and/or mobile broadband wireless access (BWA) networks (e.g., the IEEE std. 802.16, published 2004). The subscriber stations 110 may also use direct sequence spread spectrum (DSSS) modulation (e.g., the IEEE std. 802.11b) and/or frequency hopping spread spectrum (FHSS) modulation (e.g., the IEEE std. 802.11).

Although the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the subscriber stations 110 may also operate in accordance with other suitable wireless communication protocols that require very low power such as Bluetooth®, Ultra Wideband (UWB), and/or radio frequency identification (RFID) to communicate via wireless links.

The wireless communication system 100 may also include a BWA network, generally shown as 120. For example, the BWA network 120 may be a fixed BWA network, a portable BWA network, and/or a mobile BWA network. The BWA network 120 may operate in accordance with the IEEE 802.16 standard, variations and/or evolutions of this standard, and/or other suitable wireless communication standards. Although FIG. 1 depicts one BWA network, the wireless communication system 100 may include more BWA networks.

The BWA network 120 may include one or more base stations, generally shown as 121, 122, 123, 124, and 125, and other radio components necessary to provide communication services to the subscriber stations 110. Although FIG. 1 depicts five base stations, the BWA network 120 may include more or less base stations. The base stations 120 may operate in accordance with the applicable standard(s) for providing wireless communication services to the subscriber stations 110. That is, each base station of the BWA network 120 may be configured to operate in accordance with one or more of several wireless communication protocols to communicate with the subscriber stations 110.

The base stations of the BWA network 120 may also operate in accordance with other wireless communication protocols. In particular, these wireless communication protocols may be based on analog, digital, and/or dual-mode communication system standards such as the Global System for Mobile Communications (GSM) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

The BWA network 120 may be operatively coupled to a common public or private network 130 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. Accordingly, the wireless communication system 100 may be implemented to provide a wireless personal area network (WPAN), a wireless local area network (WLAN), a wireless metropolitan area network (WMAN), a wireless wide area network (WWAN), and/or other suitable wireless communication networks.

Further, the wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
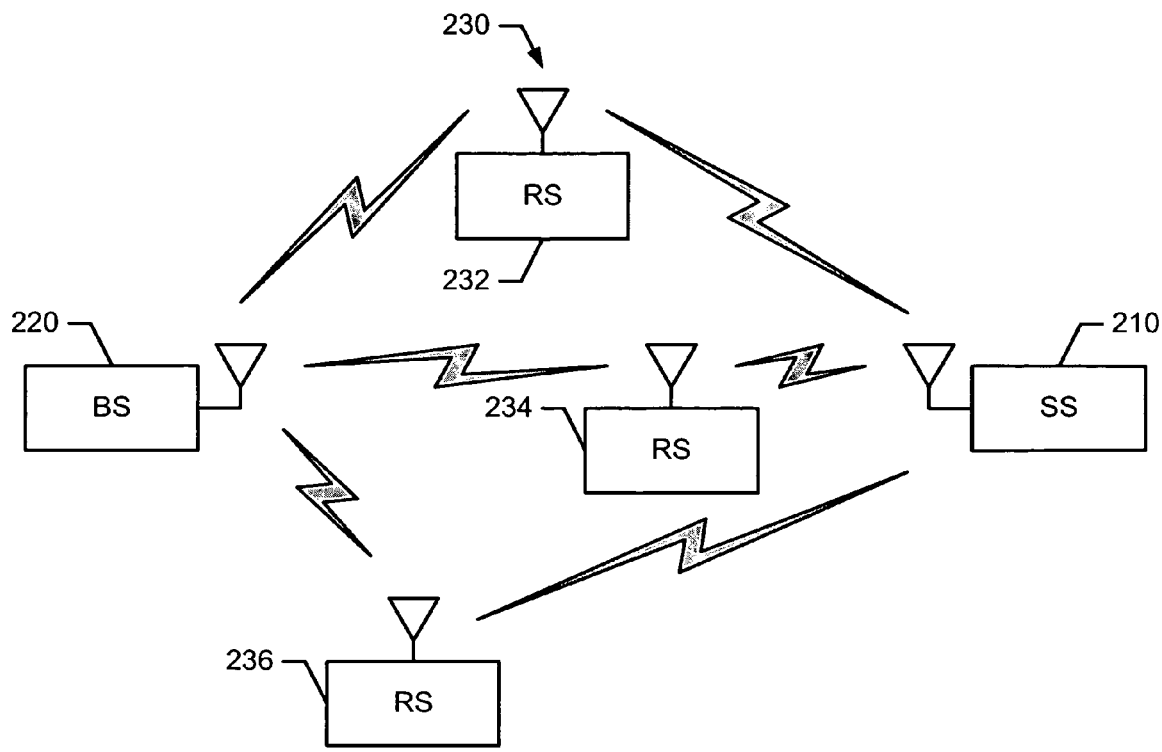
FIG. 2 is a block diagram representation of an example cooperative relay system associated with a broadband wireless access network.

In the example of FIG. 2, a cooperative relay system 200 may include one or more subscriber stations (SS), generally shown as 210 and one or more base stations (BS), generally shown as 220. In general, the base station 220 may be configured to provide communication services to the subscriber station 210. The subscriber station 210 and the base station 220 may be communicatively coupled to each other via wireless communication link(s). Although FIG. 2 depicts one subscriber station, the cooperative relay system 200 may include more subscriber stations. Further, while FIG. 2 depicts one base station, the cooperative relay system 200 may include more base stations.

The cooperative relay system 200 may also include one or more relay stations (RS) 230, generally shown as 232, 234, and 236. The relay stations 230 may be communicatively coupled to the subscriber station 210 and/or the base station 220 via wireless communication link(s). In one example, the relay stations 230 may be communication stations particularly configured to provide support for cooperative relay transmissions. In another example, the relay stations 230 may be base stations and/or subscriber stations configured to provide support for cooperative relay transmissions.

In general, one or more of the relay stations 230 may receive a wireless transmission from the base station 220 directed to the subscriber station 210 or vice versa. Without having knowledge of the content of the transmission, the relay stations 230 (e.g., via a cyclic redundancy check (CRC)) may evaluate the reliability of the wireless transmission before, during, and/or after decoding the transmission. The relay stations 230 may also evaluate the reliability of the wireless transmission based on previous reception activities prior to the CRC (e.g., estimation on decoding quality and/or estimation on arriving symbols quality).

As described in detail below, the relay stations 230 may generate a relay transmission associated with the wireless transmission. In particular, the relay stations 230 may generate a single-repetition relay transmission or a multiple-repetition relay transmission. The relay stations 230 may generate the relay transmission in response to a repeat request from the subscriber station 210 and/or the base station 220. In one example, the relay stations 232, 234, and/or 236 may repeat a data burst from the base station 220 to the subscriber station 210. The subscriber station 210 may receive common transmissions from the relay stations 232, 234, and 236 via a radio frequency (RF) signal-combination method. In another example, the relay stations 232, 234, and/or 236 may repeat a data burst from the subscriber station 210 to the base station 220.

With adequate time difference between relay transmissions (e.g., hops), additional relay stations may join the cooperative relay system 200 by using previous relay transmissions. For example, although the relay station 234 may not be able to receive a data burst directly from the base station 220 because of a high modulation-coding scheme used by the base station 220 (e.g., 64-Quadrature Amplitude Modulation (QAM) rate ⅔), the relay station 234 may be able to receive map information because the map information may be coded at Quadrature Phase-Shift Keying (QPSK) rate ½), which may be more robust to noise and attenuation. Further, the relay station 234 may participate as long as the remaining-hops number is approximate to the hops distance from the relay station 234 to the destination (e.g., the subscriber station 210). The remaining-hops number may be based on a hop index and the total-hops number. The hops distance may be based on proximate past-received hops originated at the destination of the data burst.

Thus, the relay stations 230 may reduce power and intercell interference by operating in a passive manner as described above in connection with the relay station 234. The relay stations 230 may also extend the range of operation between the subscriber station 210 and the base station 220. Accordingly, the number of base stations required in a BWA network (e.g., the BWA network of 120 in FIG. 1) may be reduced. Further, the relay stations 230 may assist the base station 220 to provide communication services to the subscriber station 210 in sub-optimal channel conditions. For example, the relay stations 230 may provide greater coverage area of the base station 220 and/or increase throughput of the BWA network (e.g., greater data rate).

Although the above examples may depict a cooperative relay system including a base station and a subscriber station, the cooperative relay system 200 may not include a base station. In one example, a wireless transmission may originate from a first subscriber station to a second subscriber station. Thus, the relay stations 230 may generate a relay transmission based on the wireless transmission from the first subscriber station and transmit the relay transmission to the second subscribe station. The methods and apparatus described herein are not limited in this regard.

Figure 3:
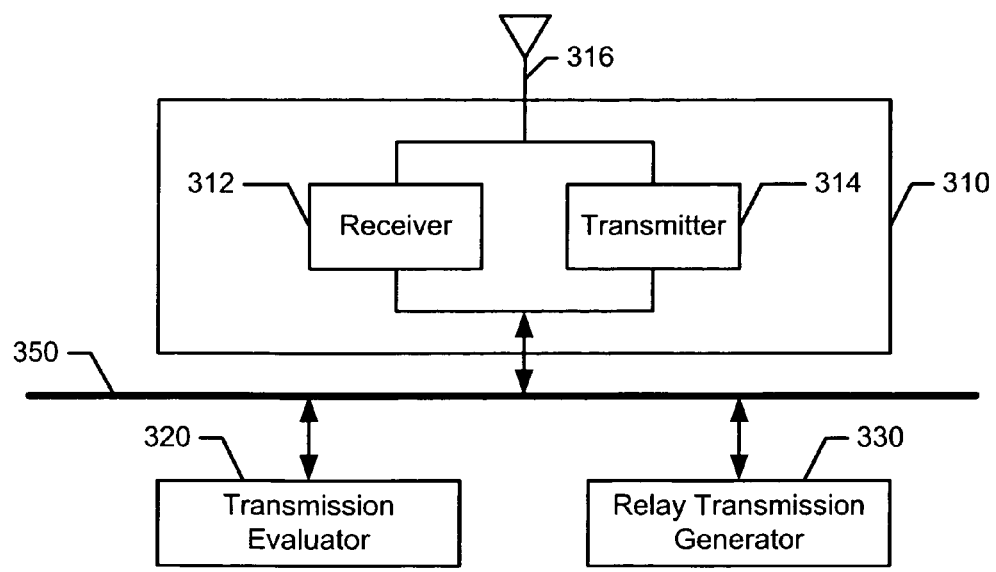
FIG. 3 is a block diagram representation of an example relay station of the example cooperative relay system of FIG. 2.

Turning to FIG. 3, for example, a relay station 300 (e.g., the relay station 232, 234, or 236 of FIG. 2) may include a communication interface 310, a transmission evaluator 320, and a relay transmission generator 330. Although FIG. 3 depicts components of the relay station 300 coupling to each other via a bus 350, these components may be operatively coupled to each other via other suitable direct or indirect connections (e.g., a point-to-point connection or a point-to-multiple point connection).

The communication interface 310 may include a receiver 312, a transmitter 314, and an antenna 316. The communication interface 310 may receive and/or transmit data via the receiver 312 and the transmitter 314, respectively. The antenna 316 may include one or more directional or omnidirectional antennas such as dipole antennas, monopole antennas, patch antennas, loop antennas, microstrip antennas, and/or other types of antennas suitable for transmission of RF signals. Although FIG. 3 depicts a single antenna, the relay station 300 may include additional antennas. For example, the relay station 300 may include a plurality of antennas to implement a multiple-input-multiple-output (MIMO) system.

As described in detail below, the communication interface 310 (e.g., via the receiver 312) may receive a wireless transmission from a communication station. The wireless transmission may include a data frame with a plurality of bits. In one example, the relay station 300 may receive a wireless transmission from a base station, a subscriber station, or another relay station. The transmission evaluator 320 may determine whether the wireless transmission is reliable (e.g., via a CRC). In particular, the transmission evaluator 320 may determine the location within the data frame and/or modulation level (e.g., 16-Quadrature Amplitude Modulation (QAM) or 64-QAM) of a data burst.

Accordingly, the relay transmission generator 330 may generate a relay transmission associated with the wireless transmission. In particular, a single-repetition relay transmission (e.g., the relay transmission 400 of FIG. 4) or a multiple-repetition relay transmission (e.g., the relay transmission 500 of FIG. 5). For example, the relay transmission generator 350 may generate a data burst located in a single region or in multiple regions of a current frame or a subsequent frame relative to the current frame. The relay transmission generator 330 may generate the relay transmission in response to a repeat request from the communication station transmitting the wireless transmission (e.g., the base station 220). In addition or alternatively, the relay transmission generator 330 may automatically generate the relay transmission in response to receipt of the wireless transmission. A base station (e.g., the base station 220 of FIG. 2) may control relay transmission characteristics such as location (e.g., time and/or frequency), modulation, coding, and/or power associated with the relay transmission of the relay transmission generator 330.

While the components shown in FIG. 3 are depicted as separate blocks within the relay station 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the transmission evaluator 320 and the relay transmission generator 330 are depicted as separate blocks, the transmission evaluator 320 and the relay transmission generator 330 may be integrated into a single component. The methods and apparatus described herein are not limited in this regard.

Figure 4:
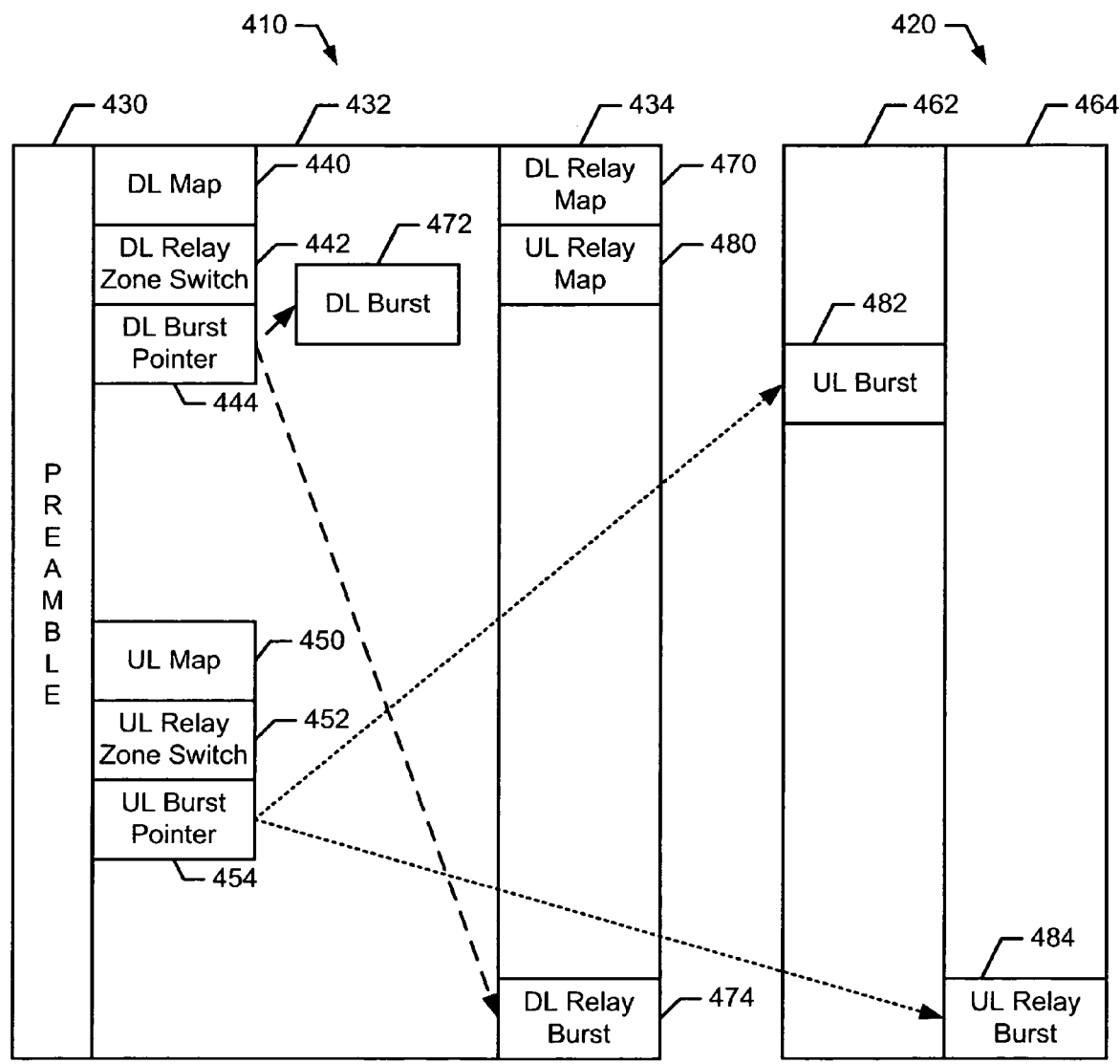
FIG. 4 depicts an example frame structure of a single-repetition relay transmission.

Referring to FIG. 4, for example, a frame structure of a single-repetition relay transmission 400 may include a downlink (DL) sub-frame 410 and an uplink (UL) sub-frame 420. In particular, the DL sub-frame 410 may include a preamble 430, a DL transmission zone 432, and a DL relay zone 434. The preamble 430 may be a training symbol at the beginning of the single-repetition relay transmission 400 used for various synchronization tasks. The DL transmission zone 432 may include a DL map 440, a DL relay zone switch 442, a DL burst pointer 444, a UL map 450, a UL relay zone switch 452, and a UL burst pointer 454. The UL sub-frame 420 may include a UL transmission zone 462 and a UL relay zone 464. Although FIG. 4 depicts particular examples of the DL sub-frame 410 and the UL sub-frame 420, the DL sub-frame 410 and/or the UL sub-frame 420 may include other suitable data bursts, symbols, information elements, etc.

The DL map 440 may include information describing contents of the DL sub-frame 410. In particular, the DL map 440 may include DL relay transmission information indicating communication stations (e.g., relay stations 230) that support cooperative relay transmissions to transmit reliable code bits of a DL burst 472 in the DL transmission zone 432. The DL map 440 may also include information indicating the communication station(s), the sub-channel(s), and/or coding and modulation for relaying the DL burst 472. The DL relay zone switch 442 may indicate the timing of the start of the downlink and uplink relay transmissions within the frame of the single-repetition relay transmission 400. In particular, the DL relay zone switch 442 may identify a location of the DL sub-frame 410 and configure the DL relay zone 434 to the identified DL sub-frame location. The DL relay zone 434 may include a DL relay map 470 and UL relay map 480. The DL burst pointer 444 may identify the DL burst 472 in the DL sub-frame 410. Based on the DL relay map 470 in the DL relay zone 434, the DL burst pointer 444 may generate a single repetition of the DL burst 472, generally shown as a DL relay burst 474 in the DL relay zone 434. In one example, the DL relay burst 474 of the relay station 232 (FIG. 2) may be destined for the base station 220. The DL burst pointer 444 and the DL relay burst 474 may be separate information elements. Although FIG. 4 depicts a single DL relay burst in the DL relay zone 434, the DL relay zone 434 may include additional DL relay bursts corresponding to other DL bursts.

The UL map 450 may include information describing contents of the UL sub-frame 420. In particular, the UL map 450 may include UL relay transmission information indicating communication stations (e.g., relay stations 230) that support cooperative relay transmissions to transmit reliable decoded bits of a UL burst 482 in the UL transmission zone 462. The UL map 450 may also include information indicating the communication station(s), the sub-channel(s), and/or coding and modulation for relaying the UL burst 482. The UL relay zone switch 452 may identify a location of the UL sub-frame 420 and configure the UL relay zone 464 to the identified UL sub-frame location. The UL burst pointer 454 may identify the UL burst 482 in the UL sub-frame 420. Based on the UL relay map 480 in the DL relay zone 434, the UL burst pointer 454 may generate a single repetition of the UL burst 482, generally shown as a UL relay burst 484 in the UL relay zone 464. In one example, the UL relay burst 484 of the relay station 232 (FIG. 2) may be destined for the subscriber station 210. The UL burst pointer 454 and the UL relay burst 484 may be separate information elements. Although FIG. 4 depicts a single UL relay burst in the UL relay zone 464, the UL relay zone 464 may include additional UL relay bursts corresponding to other UL bursts. The methods and apparatus described herein are not limited in this regard.

Figure 5:
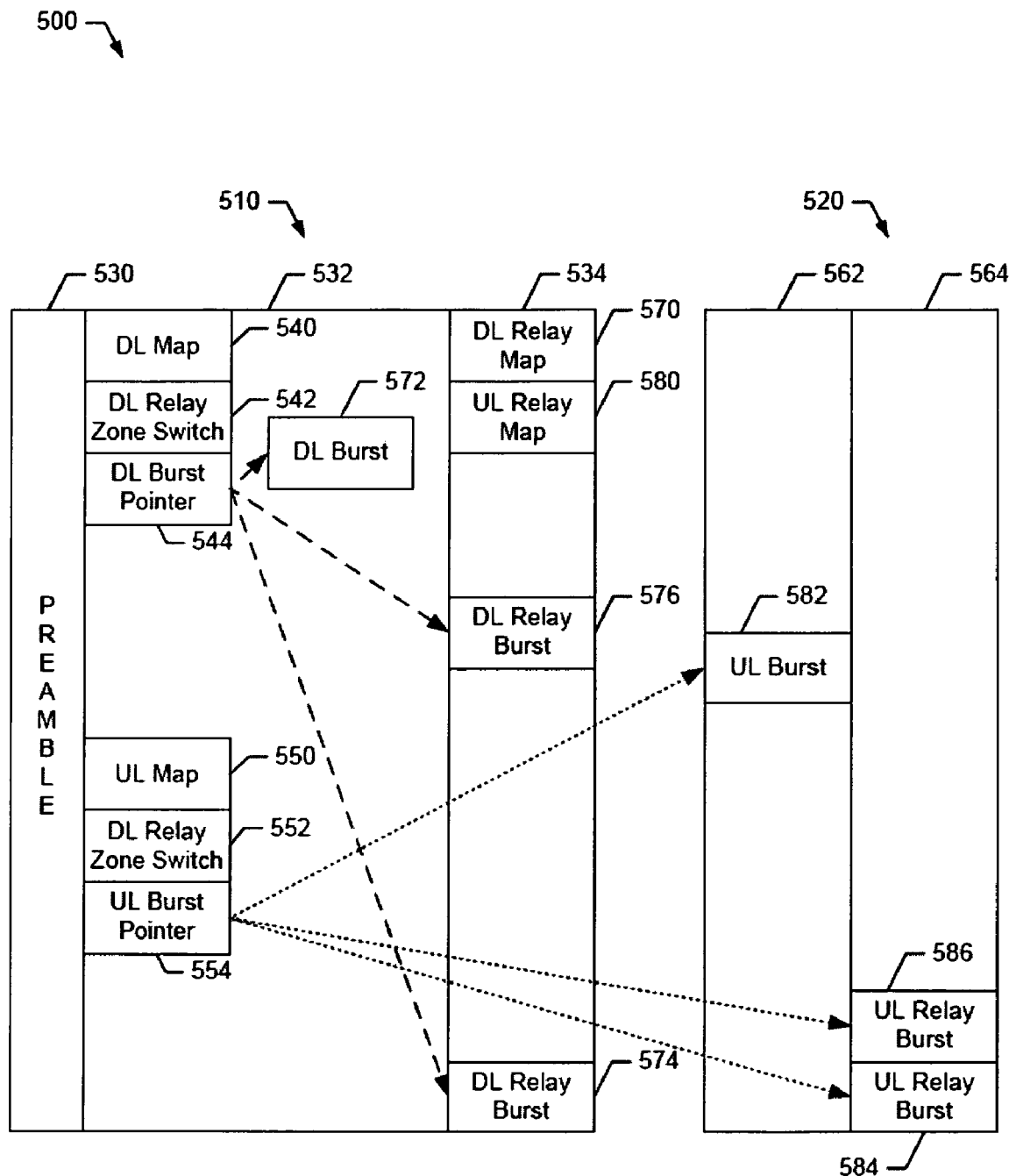
FIG. 5 depicts an example frame structure of a multiple-repetition relay transmission.

Turning to FIG. 5, for example, a frame structure of a multiple-repetition relay transmission 500 may include a downlink (DL) sub-frame 510 and an uplink (UL) sub-frame 520. In particular, the DL sub-frame 510 may include a preamble 530, a DL transmission zone 532, and a DL relay zone 534. The preamble 530 may be a training symbol at the beginning of the multiple-repetition relay transmission 500 used for various synchronization tasks. The DL transmission zone 532 may include a DL map 540, a DL relay zone switch 542, a DL burst pointer 544, a UL map 550, a UL relay zone switch 552, and a UL burst pointer 554. The UL sub-frame 520 may include a UL transmission zone 562 and a UL relay zone 564. Although FIG. 5 depicts particular examples of the DL sub-frame 510 and the UL sub-frame 520, the DL sub-frame 510 and/or the UL sub-frame 520 may include other suitable data bursts, symbols, information elements, etc.

The DL map 540 may include information describing contents of the DL sub-frame 510. In particular, the DL map 540 may include DL relay transmission information indicating communication stations (e.g., relay stations 230) that support cooperative relay transmissions to transmit reliable code bits of a DL burst 572 in the DL transmission zone 532. For example, the DL map 540 may include a DL relay information element. The DL relay zone switch 542 may identify a location of the DL sub-frame 510 and configure the DL relay zone 534 to the identified DL sub-frame location. In particular, the DL relay zone 534 may include a DL relay map 570 and UL relay map 580. The DL burst pointer 544 may identify the DL burst 572 in the DL sub-frame 510. Based on the DL relay map 570 in the DL relay zone 534, the DL burst pointer 544 may generate multiple repetitions of the DL burst 572, generally shown as DL relay bursts 574 and 576 in the DL relay zone 534.

The UL map 550 may include information describing contents of the UL sub-frame 520. In particular, the UL map 550 may include UL relay transmission information indicating communication stations (e.g., relay stations 230) that support cooperative relay transmissions to transmit reliable decoded bits of a UL burst 582 in the UL transmission zone 562. The UL map 550 may also include information indicating the communication station(s), the sub-channel(s), and/or coding and modulation for relaying the UL burst 582. The UL relay zone switch 552 may identify a location in the UL sub-frame 520 and configure the UL relay zone 564 to the identified UL sub-frame location. The UL burst pointer 554 may identify the UL burst 582 in the UL sub-frame 520. Based on the UL relay map 580 in the DL relay zone 534, the UL burst pointer 554 may generate multiple repetitions of the UL burst 582, generally shown as UL relay bursts 584 and 586 in the UL relay zone 564. The methods and apparatus described herein are not limited in this regard.

Although FIGS. 4 and 5 depict particular elements, the frame structures of the relay transmissions 400 and 500, respectively, may include other suitable information elements and/or zones. In one example, the relay transmissions 400 and 500 may include a midamble and/or a frame control header (FCH). In another example, the relay transmissions 400 and 500 may include additional DL relay zones, UL relay zones, and/or other suitable zones (e.g., Space-Time Coding (STC) zones, Adaptive Antenna Systems (AAS) zones and/or Multiple-Input-Multiple-Output (MIMO) zones). The methods and apparatus described herein are not limited in this regard.

As described above in connection with FIGS. 4 and 5, a destination station (e.g., the subscriber station 210 of FIG. 2) may properly receive preamble and maps transmissions associated with a base station (e.g., the base station 220 of FIG. 2). In particular, the base station 220 may transmission associated with the relay transmission of each data burst via DL/UL burst pointers in slots of a frame preceding DL/UL maps, respectively, that allocate the non-relay transmission of the data burst within the frame. In one example, the base station 220 may transmit the allocation information via the DL burst pointers 444 and 544 and/or the UL burst pointers 454 and 554.

The DL burst pointers 444 and 544 and the UL burst pointers 454 and 554 of FIGS. 4 and 5, respectively, may also include information indicative of the source and the destination of a data burst, timing information, sub-channel information, and hop information. In particular, the hop information may include a hop index of a data burst and a total number of hops for the data burst. The relay station 300 may determine whether to relay a wireless transmission based on the number of remaining hops.

Alternatively, the destination station may receive preamble and maps transmissions from one or more relay stations (e.g., one or more of the relay stations 230 of FIG. 2) instead of from a base station. As described in detail below, relay transmission to the destination station or another relay station may include midambles, map information elements, frame control headers, and data bursts.

Figure 6:
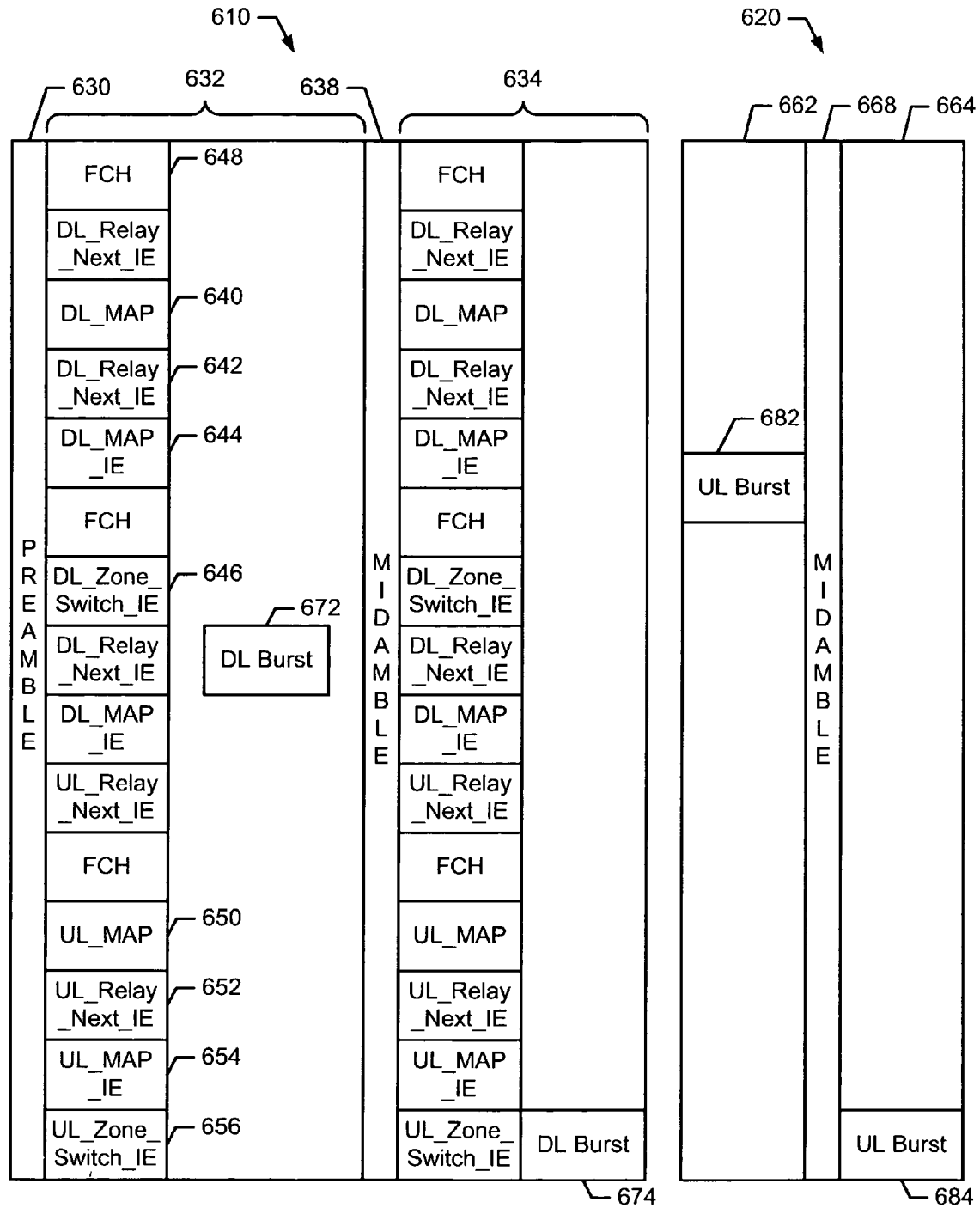
FIG. 6 depicts an example frame structure of a relay transmission associated with an IEEE 802.16-based broadband wireless access network.

In the example of FIG. 6, a frame structure of a single-repetition relay transmission 600 of an IEEE 802.16-based BWA network is described. The relay transmission 600 may include a DL sub-frame 610 and a UL sub-frame 620. In particular, the DL sub-frame 610 may include a preamble 630, a DL transmission zone 632, a DL relay zone 634, and a midamble 638. The preamble 630 may be a training symbol at the beginning of the relay transmission 600 used for various synchronization tasks.

The DL transmission zone 632 may include a DL map (e.g., generally shown as DL_MAP 640). In particular, the DL_MAP 640 may be associated with an information element (E) (e.g., generally shown as DL Relay_Next_IE 642) indicating stations that support cooperative relay to transmit reliable code bits of a DL burst 672 associated with an IE (e.g., generally shown as DL_MAP_IE 644) including mapping information. The DL_Relay_Next_IE 642 may include information of subsequent relay transmissions of a relayed DL burst (e.g., the DL burst 672). In particular, the DL Relay_Next_IE 642 may include allocation information of relay transmissions for the DL burst 672 and the DL_MAP_IE 644. The DL_Relay_Next_IE 642 may also include information indicative of the source and the destination of the DL burst 672 and the DL_MAP_E 644. The DL_Relay_Next_IE 642 may further include timing information, sub-channel information, boosting information, and repetition information of the DL burst 672 and the DL_MAP_IE 644. The DL_Relay_Next_IE 642 may include hop information of the DL burst 672. The hop information may include a hop index of a data burst and a total number of hops for the data burst. The relay station 300 may determine whether to relay a wireless transmission based on the number of remaining hops.

The DL transmission zone 632 may also include an IE (e.g., generally shown as DL_Zone_Switch_IE 646) to indicate and configure the DL relay zone 634 in accordance with a wireless transmission from a base station (e.g., the base station 220 of FIG. 2). The DL transmission zone 632 may further include a frame control header, generally shown as FCH 648.

In addition to DL information, the DL transmission zone 632 may also include UL information. In particular, DL transmission zone 632 may include a UL map (e.g., generally shown as UL_MAP 650). The UL_MAP 650 may be associated with an IE (e.g., generally shown as UL_Relay_Next_IE 652) indicating stations that support cooperative relay to transmit reliable code bits of a UL burst 682 associated with an IE (e.g., generally shown as UL_MAP_IE 654) including mapping information. The DL transmission zone 632 may also include an IE (e.g., generally shown as UL_Zone_Switch_IE 656) to indicate and configure the UL relay zone 664 in accordance with a wireless transmission from the base station (e.g., the base station 220 of FIG. 2). The UL_Relay_Next_IE 652 may include information of subsequent relay transmissions of a relayed UL burst (e.g., the UL burst 682). In particular, the UL_Relay_Next_IE 652 may include allocation information of relay transmissions for the UL burst 682 and the UL_MAP_IE 654. The UL_Relay_Next_IE 652 may also include information indicative of the source and the destination of the UL burst 682 and the UL_MAP_IE 654. The UL Relay_Next IE 652 may further include timing information, sub-channel information, boosting information, and repetition information of the UL burst 682 and the UL_MAP_IE 654. The UL_Relay_Next_IE 652 may include hop information of the UL burst 682. The hop information may include a hop index of a data burst and a total number of hops for the data burst. The relay station 300 may determine whether to relay a wireless transmission based on the number of remaining hops.

In addition to including the DL and UL information of the DL transmission zone 632 as described above, the DL relay zone 634 may include a DL burst 674 corresponding to the DL burst 672. In one example, the DL burst 674 may be destined for a base station (e.g., the base station 220 of FIG. 2). Although FIG. 6 depicts a single DL burst in the DL relay zone 634, the DL relay zone 634 may include additional DL bursts associated with other communication stations.

Similar to the preamble 630, the midamble 638 may be a training symbol used for various synchronization tasks. In particular, the midamble 638 may be used by communication stations that may not be able to receive one or more portions of a wireless transmission from a base station (e.g., the preamble 630, the DL map 640, the UL map 650, and/or the FCH 648).

The UL sub-frame 620 may include a UL transmission zone 662, a UL relay zone 664, and a midamble 668. The UL transmission zone 662 may include the UL burst 682 associated with the UL_MAP_IE 654. The UL relay zone 664 may include a UL burst 684 corresponding to the UL burst 682. In one example, the UL burst 684 may destined for a subscriber station (e.g., the subscriber station 210 of FIG. 2). Although FIG. 6 depicts a single UL burst in the UL relay zone 664, the UL relay zone 664 may include additional UL bursts associated with other communication stations. The midamble 668 may be similar to the midamble 638 in the DL sub-frame 610. The methods and apparatus described herein are not limited in this regard.

Although FIG. 6 depicts particular elements within the DL sub-frame 610 and the UL sub-frame 620, the relay transmission 600 may include additional or less elements. In one example, the DL sub-frame 610 and the UL sub-frame 620 may include additional DL bursts or UL bursts, respectively.

Figure 7:
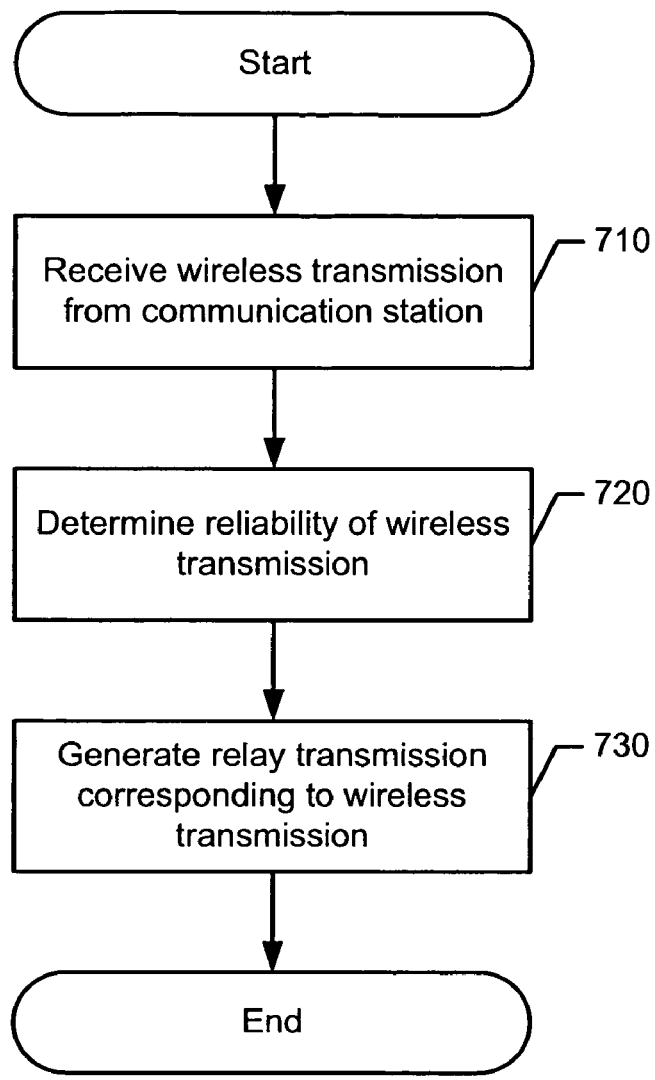
FIG. 7 is a flow diagram representation of one manner in which the example relay station of FIG. 3 may be configured.

FIG. 7 depicts one manner in which the example RS 300 of FIG. 3 may be configured to operate in a cooperative relay system. The example process 700 of FIG. 7 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 7, these actions may be performed in other temporal sequences. Again, the example process 700 is merely provided and described in conjunction with the apparatus of FIGS. 2 and 3 as an example of one way to configure a relay station to operate in the cooperative relay system 200.

In the example of FIG. 7, the process 700 may begin with the relay station 300 (e.g., via the communication interface 310) receiving a wireless transmission from a communication station (block 710). In particular, the source of the wireless transmission may be a base station, a subscriber station, or another relay station. In one example, the relay station(s) 230 (FIG. 2) may receive a wireless transmission from the base station 220. In another example, the relay station(s) 230 may receive a wireless transmission from the subscriber station 210.

The relay station 300 (e.g., via the transmission evaluator 320) may determine whether the wireless transmission is reliable (block 720). In particular, the relay station 300 may determine whether one or more portions of the wireless transmission are reliable to be relayed (e.g., only a portion of the wireless transmission may reliable). The relay station 300 may determine the reliability of the wireless transmission by identifying the location and the modulation level of a plurality of bits associated with the wireless transmission. For example, the reliability of the wireless transmission may be based on CRC, code block decoding quality and/or symbol quality. The reliability of the wireless transmission may be evaluated before, during, and/or after decoding of the plurality of bits.

The relay station 300 (e.g., via the relay transmission generator 330) may generate a relay transmission associated with the wireless transmission (block 730). For example, the relay transmission may be a single-repetition relay transmission (e.g., the relay transmission 400 of FIG. 4) or a multiple-repetition relay transmission (e.g., the relay transmission 500 of FIG. 5). The relay station 300 may generate the relay transmission based on relay configuration information from a base station (e.g., the base station 220 of FIG. 2) directly or indirectly. For example, the relay configuration information may include location (e.g., time and/or frequency) information, modulation information, coding information, power information and/or other suitable information. In one example, the base station 220 may request the relay stations 230 to generate relay transmissions for a wireless transmission to the subscriber station 210 and/or other communication stations. Alternatively, the relay station(s) 230 may automatically generate the relay transmissions in response to receipt of the wireless transmission. The methods and apparatus described herein are not limited in this regard.

Although the methods and apparatus disclosed herein are described with respect to BWA networks, the methods and apparatus disclosed herein may be applied to other suitable types of wireless communication networks. For example, the methods and apparatus disclosed herein may be applied to WPANs, WLANs, WMANs, and/or WWANs.

Figure 8:
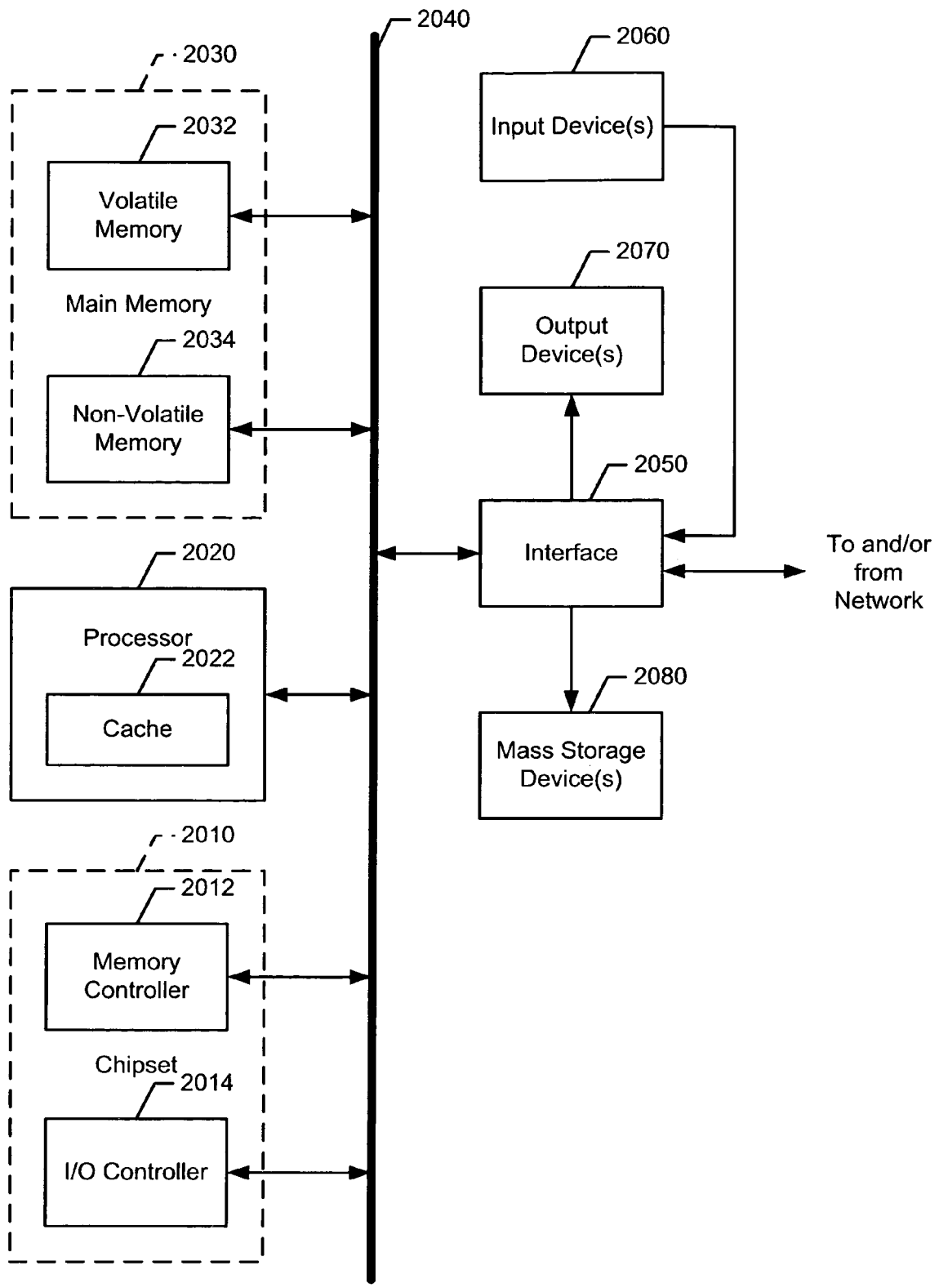
FIG. 8 is a block diagram representation of an example processor system that may be used to implement the example relay station of FIG. 3.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:

receiving a wireless transmission having a data burst at a relay station of a broadband wireless access network, the wireless transmission being associated with a wireless communication to a first communication station from a second communication station; and generating a relay transmission associated with the wireless transmission to transmit to the first communication station, the relay transmission having one or more repetitions of the data burst, wherein the one or more repetitions include one or more relay bursts in one or more relay zones of at least one of a current data frame and/or a subsequent data frame relative to the current data frame, further comprising configuring a downlink relay zone in a downlink sub-frame of the data frame, and wherein the downlink relay zone being configured to include one or more downlink relay bursts.

2. A method as defined in claim 1, wherein receiving the wireless transmission at the relay station comprises receiving the wireless transmission at one of a base station or a subscriber station.

3. A method as defined in claim 1, wherein receiving the wireless transmission at the relay station comprises receiving the wireless transmission at the relay station from one of a base station, a subscriber station, or another relay station.

4. A method as defined in claim 1, wherein generating the relay transmission comprises generating a relay transmission based on relay configuration information from a base station.

5. A method as defined in claim 1, wherein generating the relay transmission comprises generating a relay transmission in response to a repeat request.

6. A method as defined in claim 1 further comprising configuring a downlink relay zone in a downlink sub-frame of the data frame, and wherein the downlink relay zone being configured to include one or more downlink relay bursts.

7. A method as defined in claim 1 further comprising evaluating reliability of bits associated with the wireless transmission.

8. An article of manufacture comprising machine-accessible instructions stored on a machine accessible media, wherein the machine-accessible instructions when accessed, causes a machine to:
receiving a wireless transmission having a data burst at a relay station of a broadband wireless access network, the wireless transmission being associated with a wireless communication to a first communication station from a second communication station; and
generating a relay transmission associated with the wireless transmission to transmit to the first communication station, the relay transmission having one or more repetitions of the data burst, wherein the one or more repetitions include one or more relay bursts in one or more relay zones of at least one of a current data frame and/or a subsequent data frame relative to the current data frame,
wherein the machine-accessible instructions when accessed, causes the machine to configure a downlink relay zone in a downlink sub-frame of the data frame, and wherein the downlink relay zone being configured to include one or more downlink relay bursts.

9. An article of manufacture as defined in claim 8, wherein the machine-accessible instructions, when accessed, causes the machine to receive the wireless transmission at one of a base station or a subscriber station.

10. An article of manufacture as defined in claim 8, wherein the machine-accessible instructions, when accessed, causes the machine to generate the relay transmission by generating a relay transmission in response to a repeat request.

11. An article of manufacture as defined in claim 8, wherein the machine-accessible instruction, when accessed, causes the machine to configure an uplink relay zone in an uplink sub-frame of the data frame, and wherein the uplink relay zone being configured to include one or more uplink relay bursts.

12. An article of manufacture as defined in claim 8, wherein the machine-accessible instructions, when accessed, causes the machine to evaluate reliability of bits associated with the wireless transmission.

13. An apparatus comprising:
a receiver to receive a wireless transmission having a data burst at a relay station of a broadband wireless access network, the wireless transmission being associated with a wireless communication to a first communication station from a second communication station; and
a relay transmission generator operatively coupled to the receiver to generating a relay transmission associated with the wireless transmission to transmit to the first communication station, the relay transmission having one or more repetitions of the data burst, wherein the one or more repetitions include one or more relay bursts in one or more relay zones of at least one of a current data frame and/or a subsequent data frame relative to the current data frame,
wherein the relay transmission generator is configured to configure a downlink relay zone in a downlink sub-frame of the data frame, and wherein the downlink relay zone being configured to include one or more downlink relay bursts.

14. An apparatus as defined in claim 13, wherein the relay station comprises one of a one of a base station or a subscriber station.

15. An apparatus as defined in claim 13, wherein the relay transmission generator is configured to generate a relay transmission based on relay configuration information from a base station.

16. An apparatus as defined in claim 13, wherein the relay transmission generator is configured to generate a relay transmission in response to a repeat request.

17. An apparatus as defined in claim 13, wherein the relay transmission generator is configured to configure an uplink relay zone in an uplink sub-frame of the data frame, and wherein the uplink relay zone being configured to include one or more uplink relay bursts.

18. An apparatus as defined in claim 13 further comprising a transmission evaluator to evaluate reliability of bits associated with the wireless transmission.

19. A system comprising:
a flash memory; and
a processor coupled to the flash memory to receive a wireless transmission having a data burst at a relay station of a broadband wireless access network, and to generate a relay transmission associated with the wireless transmission to transmit to a first communication station,
wherein the wireless transmission being associated with a wireless communication to a first communication station from a second communication station; and wherein the relay transmission comprises one or more repetitions of the data burst, wherein the one or more repetitions include one or more relay bursts in one or more relay zones of at least one of a current data frame and/or a subsequent data frame relative to the current data frame,
wherein the processor is configured to configure a downlink relay zone in a downlink sub-frame of the data frame, and wherein the downlink relay zone being configured to include one or more downlink relay bursts.

20. A system as defined in claim 19, wherein the processor is configured to receive the wireless transmission at one of a base station or a subscriber station.

21. A system as defined in claim 19, wherein the processor is configured to generate a relay transmission in response to a repeat request.

22. A system as defined in claim 19, wherein the processor is configured to configure an uplink relay zone in an uplink sub-frame of the data frame, and wherein the uplink relay zone being configured to include one or more uplink relay bursts.

* * * * *